Figure 18:
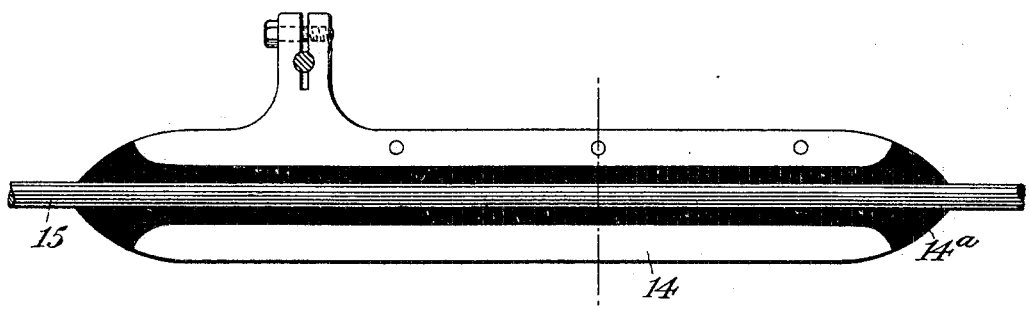

No. 799,064. PATENTED SEPT. 12, 1905.
H. KOWSKY.
PNEUMATIC OR HYDRAULIC TRANSMISSION OF ELECTRIC POWER.
APPLICATION FILED SEPT. 5, 1902.
7 SHEETS—SHEET 1.
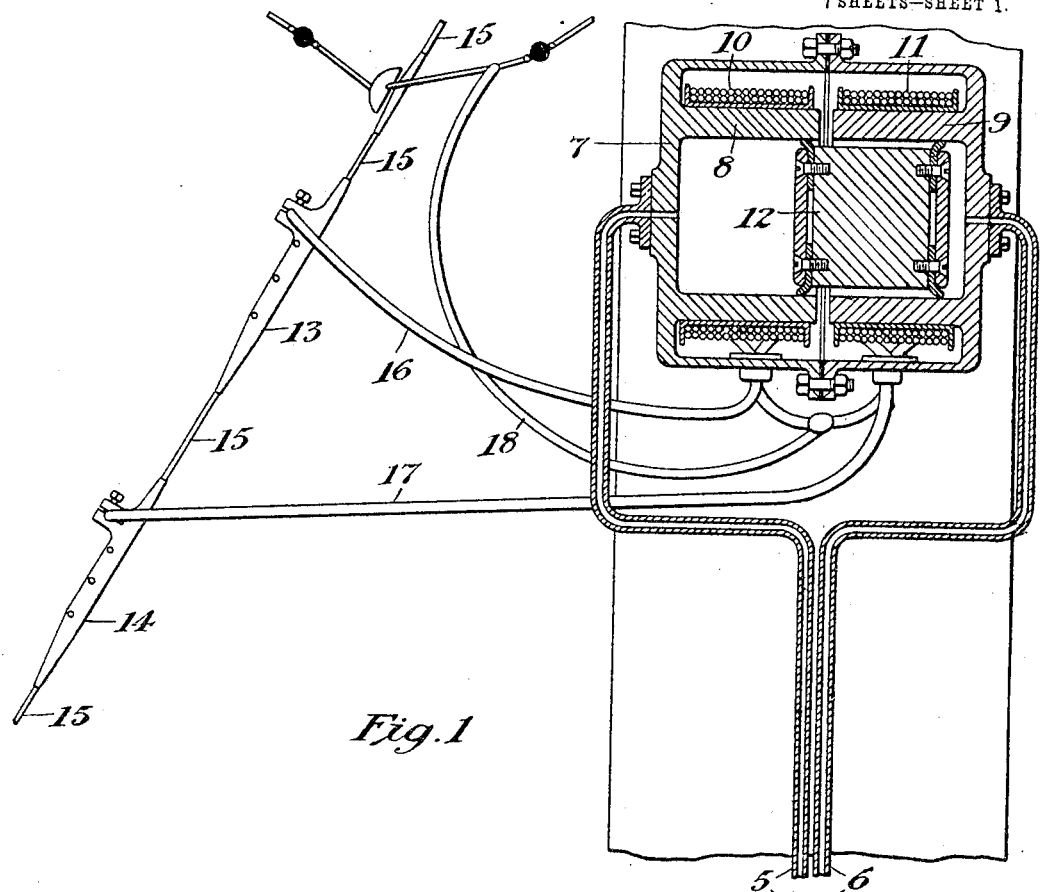
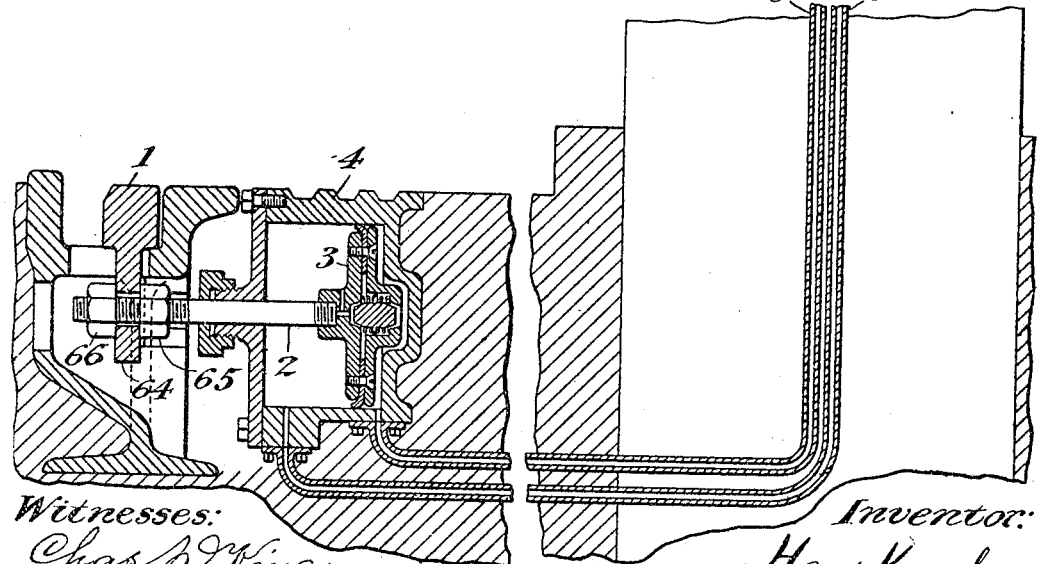
Fig. 1
Witnesses:
Chas. W. King
Adolph P. Kinse
Inventor:
Hans Kowsky,
By Lewis J. Doolittle,
Atty.

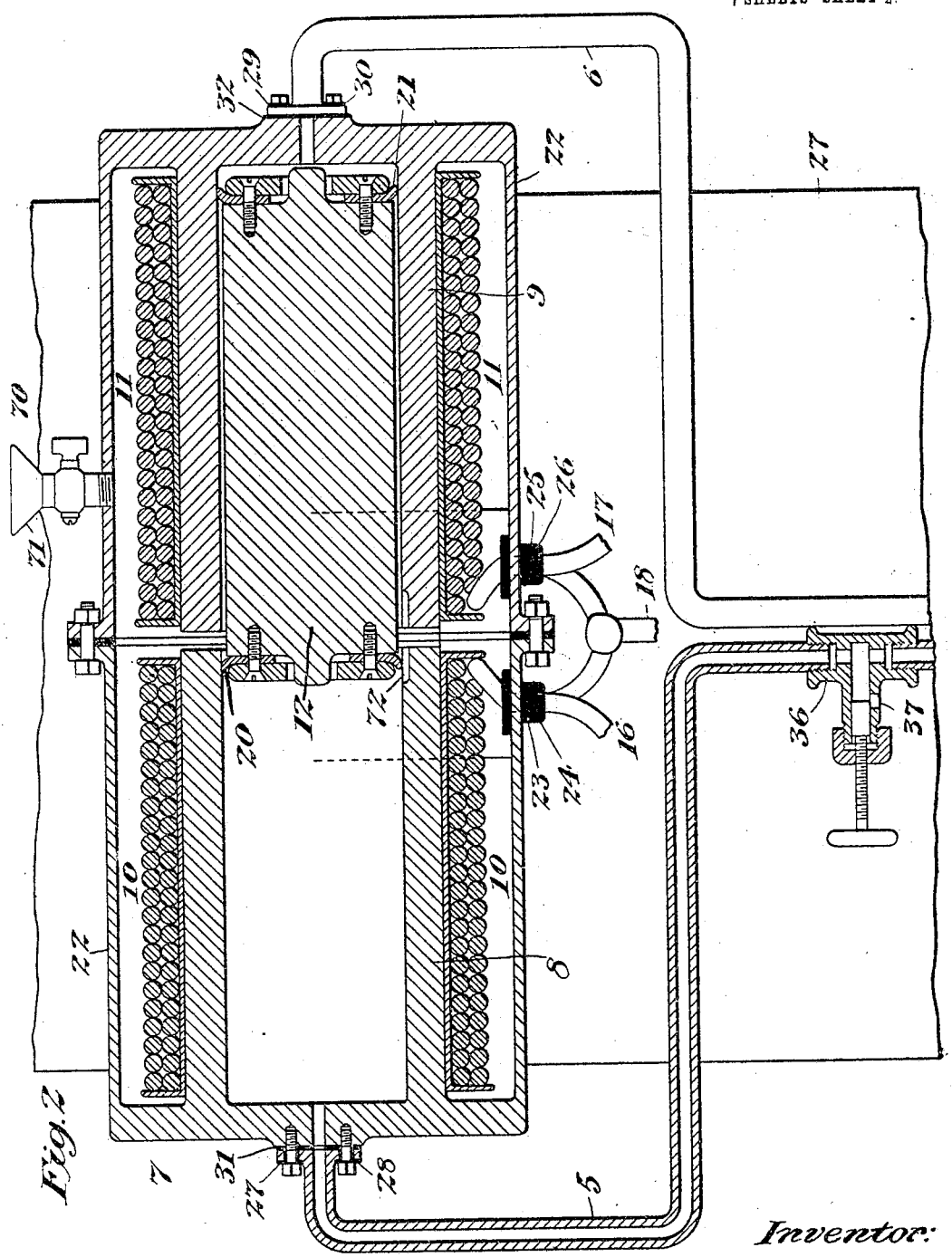

No. 799,064. PATENTED SEPT. 12, 1905.
H. KOWSKY.
PNEUMATIC OR HYDRAULIC TRANSMISSION OF ELECTRIC POWER.
APPLICATION FILED SEPT. 5, 1902.
7 SHEETS—SHEET 3.
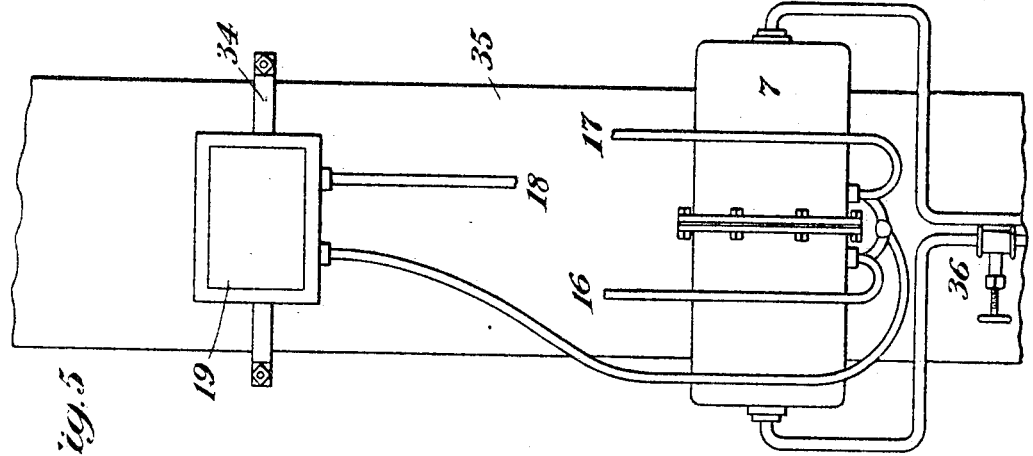
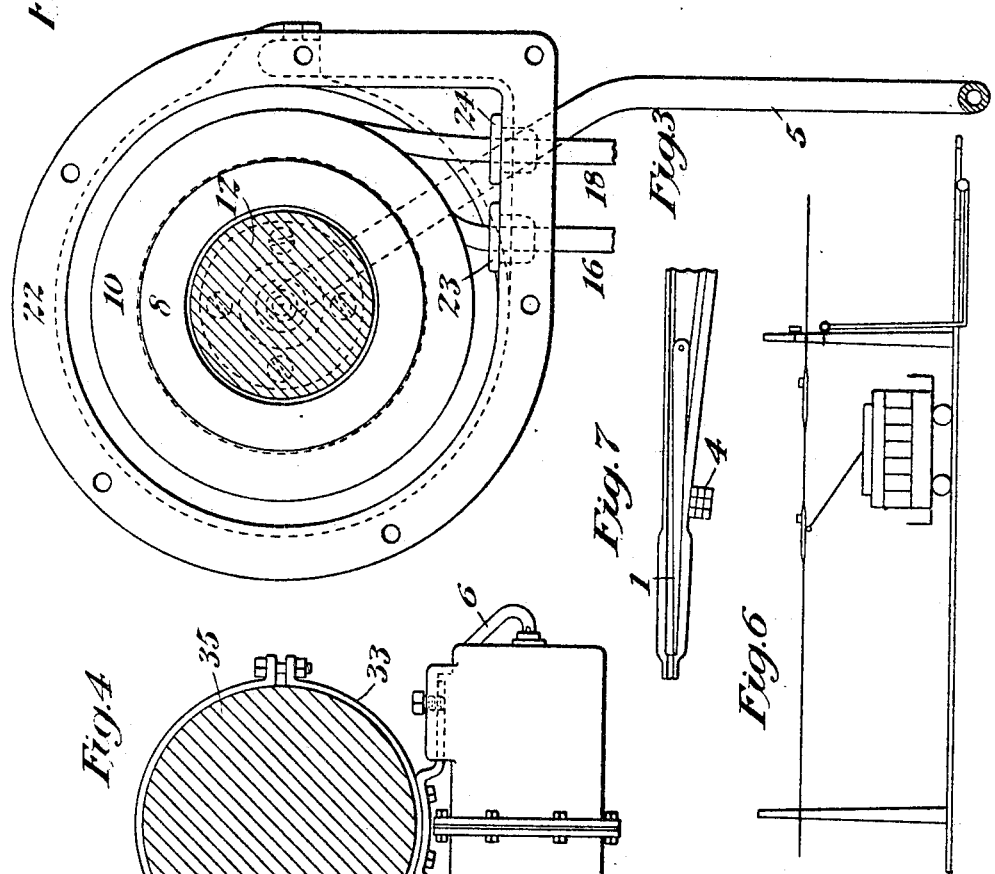
Witnesses:
Chas. D. King.
Adolph P. ____
Inventor:
Hans Kowsky,
By Lewis J. Doolittle,
Atty.

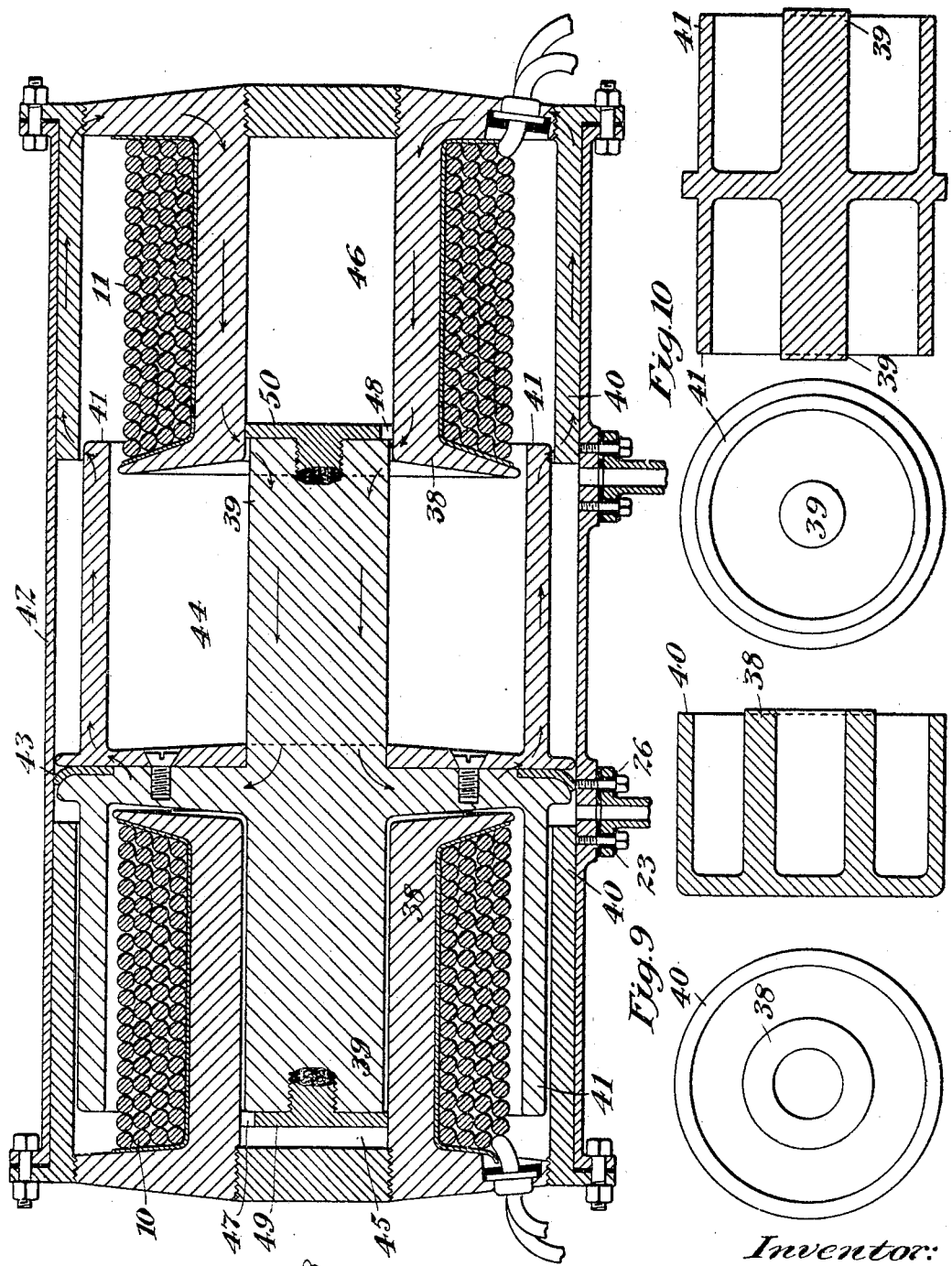

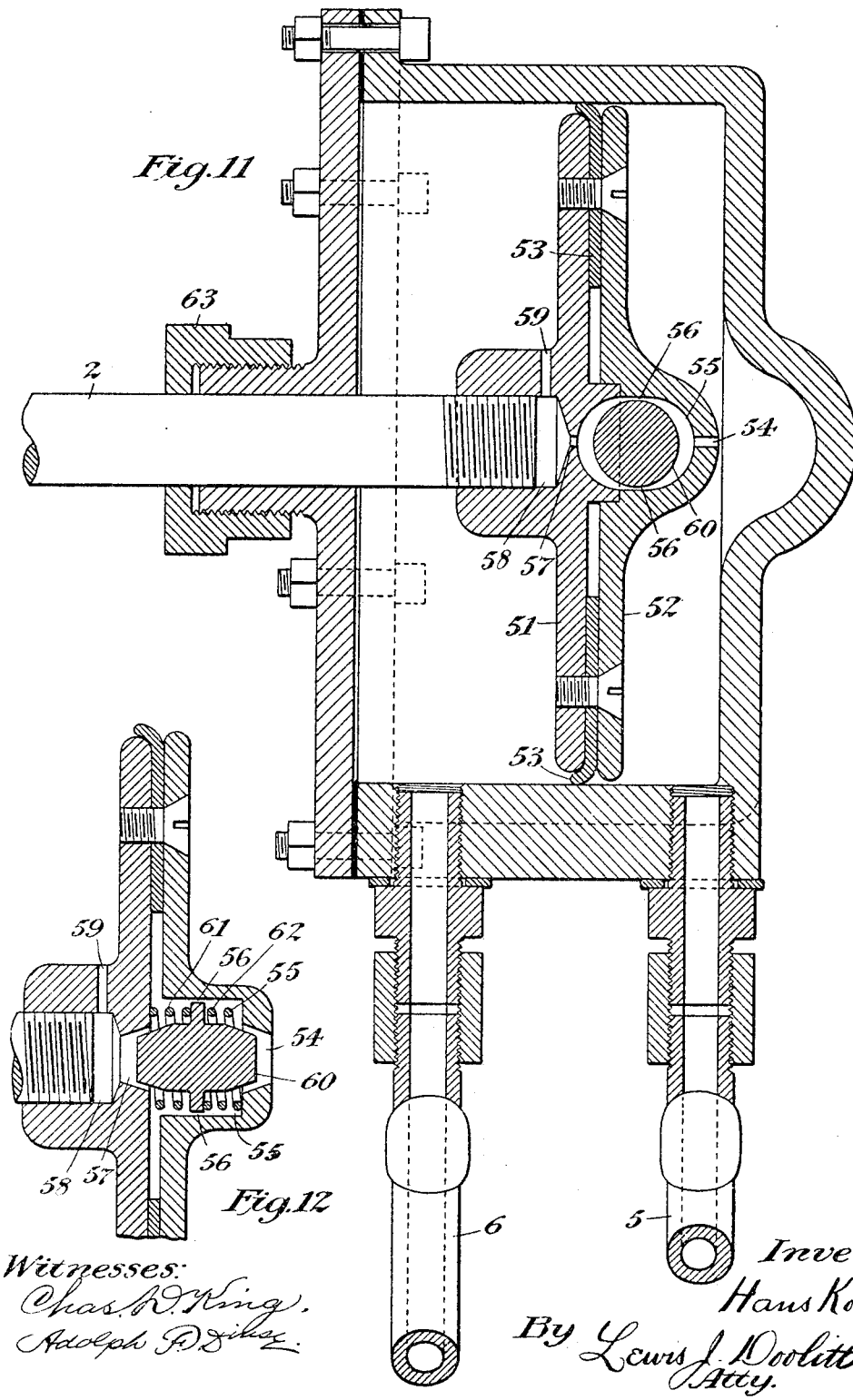

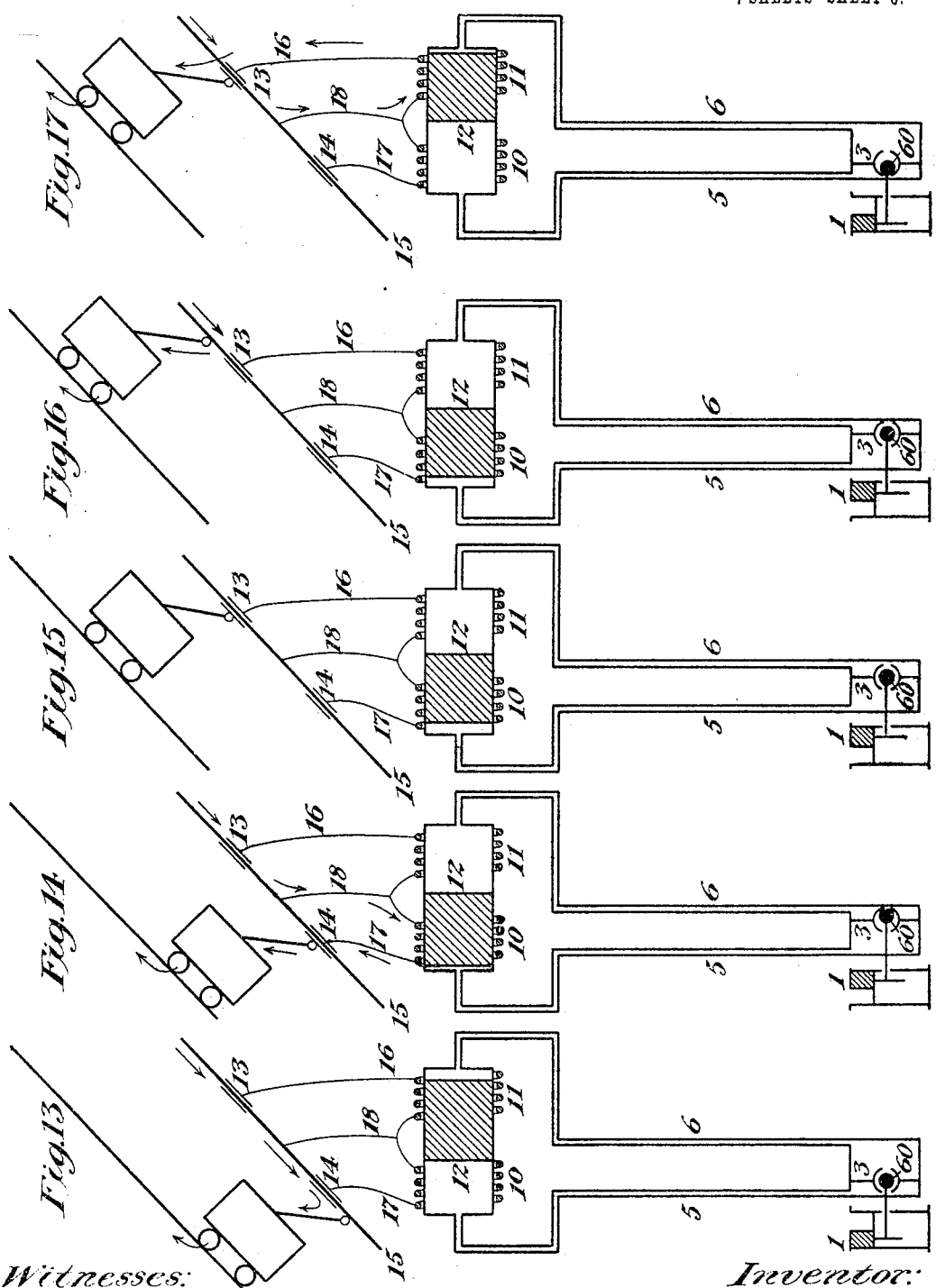

UNITED STATES PATENT OFFICE.

HANS KOWSKY, OF HASTINGS UPON HUDSON, NEW YORK.

PNEUMATIC OR HYDRAULIC TRANSMISSION OF ELECTRIC POWER.

No. 799,064.  Specification of Letters Patent.  Patented Sept. 12, 1905.

Application filed September 5, 1902. Serial No. 122,213.

*To all whom it may concern:*

Be it known that I, HANS KOWSKY, a citizen of the German Empire, residing at Hastings upon Hudson, in the county of Westchester and State of New York, have invented certain new and useful Improvements in Pneumatic or Hydraulic Transmission of Electric Power, of which the following is a specification, reference being had therein to the accompanying drawings.

This invention relates to an improved system of power-transmission, and more especially to a system in which the primary source of power is obtained by the use of an electric current to operate an electromagnet or solenoid which in turn operates to compress a fluid in a suitable chamber. This fluid is conducted by pipes or other suitable means to a secondary chamber or cylinder where the pressure is exerted against a movable piston, causing it to move in unison with the solenoid or armature of the electromagnet and by suitable mechanical connection will operate any desired mechanism.

A further feature of my device is that by the use of a suitable piston in connection with the solenoid I am enabled not only to compress the fluid on one side thereof, but produce a partial vacuum and suction on the other side, and by the use of two pipes leading to opposite sides of the secondary piston the suction so produced adds to the efficiency and quick operation of the increased pressure to move this secondary piston.

In referring to the cylinders and pistons used to illustrate my invention in this application I shall refer to the one operated by electrical means to compress the fluid as the "primary" and the one operated by the fluid-pressure as the "secondary."

The object of my invention is the transformation of electric power into mechanical movement and to provide means for reproducing such movement at a point more or less distant from the source of electric power. The utility of such a device is particularly evident in places where it would be impracticable or impossible by reason of dampness or other causes of electric leakage to bring the current to the point of its application. A common application and use of a device of this nature is in the operation of a track-switch for railroads, and I have taken such an application to illustrate my invention.

In this device an electromagnet or solenoid is employed to operate the primary piston in its cylinder. This piston operates upon the transmitting medium, which is carried through pipes to a secondary cylinder, when it in turn moves a secondary piston which is connected to a switch-tongue. The primary piston may be connected to the solenoid or armature of an electromagnet or it may in itself constitute the solenoid or armature or a part thereof. The casing of the primary cylinder may form a part of the magnet-circuit of the operating-electromagnet. This will be more fully explained in connection with the drawings accompanying this specification. The many advantages of such a device over rods or cables, with their numerous levers and guiding devices, will be evident, especially where the distance of transmission is great and losses by friction will be large, as well as loss of motion, due to yielding of the rod members and loose joints, &c.

The simplicity of my invention reduces the number of parts, but increases the efficiency and renders the operation thereof positive and effective, thus presenting a device which has practically but two moving members, but at the same time possesses many functions.

In the drawings accompanying this specification is shown an embodiment of my invention applied to a device for operating a switch.

In the several views similar parts are given the same reference-number.

Figure 19:
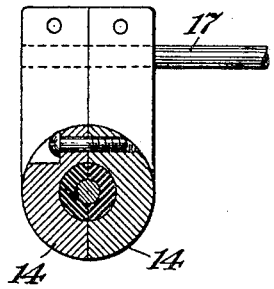

Figure 1 is a vertical sectional view of a primary and secondary cylinder with the electrical connections to a trolley-wire and pipe connections between the cylinders. Fig. 2 is an enlarged vertical section of the primary cylinder shown in Fig. 1. Fig. 3 is an end elevation of Fig. 2. Fig. 4 is a top plan view of the primary cylinder attached to a pole. Fig. 5 is a front elevation of Fig. 4, showing a fuse-box in circuit. Fig. 6 is a diagrammatic view of a trolley-road, showing the relative position of the various parts. Fig. 7 is a plan view of the switch-tongue with the secondary piston attached thereto. Fig. 8 is a vertical section illustrating another form of primary cylinder. Figs. 9 and 10 are details of the magnet and plunger in Fig. 8. Fig. 11 is a sectional view of the secondary piston and cylinder. Fig. 12 is a sectional view of a portion of the piston of Fig. 11, showing a modification of the regulating device. Figs. 13 to 17 are diagrammatic illustrations showing the relative positions of the several parts for different positions of the car. Fig. 18 is an enlarged detail elevation, one-half removed, of the circuit-breaking device carried by the trolley-wire shown in Fig. 1 and in Figs. 13 to 17. Fig. 19 is a section end view of Fig. 18.

Referring to Fig. 1 of the drawings, 1 designates a switch-tongue connected by the stem 2 to the piston 3, contained in the secondary cylinder 4, the latter connected by pipes 5 and 6 with the primary cylinder 7, consisting of two hollow cylinders 8 and 9, provided outside with coils and having inside a core or plunger 12. One terminal of each of the coils 10 and 11 is connected electrically with one of the circuit-breakers 13 or 14 by cables 16 and 17, and the other terminal of both coils is connected with the main trolley-line 15 by cable 18, the latter being provided with a fuse-box 19. (Shown in Fig. 5.) The circuit-breakers consist of contact members, such as 14, (shown in Figs. 18 and 19,) insulated, as shown at 14ª, and encircling trolley-wire 15. The plunger 12 engages the inner mantles of the cylinder by means of sliding rings or leather collars, such as 20 and 21 in Fig. 2. The coils are inclosed in an iron casing 22, which will strengthen the magnetic pull by providing a path for the magnetic circuit passing outside of the coil. The four terminals of the coils are led through this casing by means of insulated bushings 23, 24, 25, and 26. The pipes 5 and 6 are insulated from the cylinder 7 by bushings 27, 28, 29, and 30 and washers 31 and 32. The clamps 33 and 34, Figs. 4 and 5, which fasten this cylinder and fuse-box to the pole 35, may be also insulated to prevent grounding or short-circuiting. In one of the pipes is interposed a valve 36, with an outlet-opening 37. This valve may be used to examine the pressure and condition of the transmitting medium and may also serve to cushion the intense shock of the plunger and switch-tongue by adjusting the opening therein to the desired degree, so dispensing with other special cushioning means.

Fig. 7 illustrates the relative size and location of a secondary cylinder 4 with the switch-tongue.

In Fig. 8 is shown a modification of the primary cylinder and piston in which the capacity of the air-chamber is increased. The primary cylinder when operated upon hydraulic transmitting mediums need not exceed the secondary cylinder in volume capacity, as liquids are practically non-compressible. When operated upon pneumatic transmitting mediums, such as air, it must exceed the secondary cylinder capacity, as air is compressible. With this and other objects in view in the construction of the primary cylinder shown in Fig. 8 provision is made to provide with outside measurements not altered a greater capacity of the primary air-chamber, so as to exceed by a sufficient amount the capacity of the secondary cylinder in order to compensate for the compression or contraction of the transmitting medium and to insure that sufficient power may be transmitted to the piston of the secondary cylinder to operate the same. A further object of this construction is to provide a magnetic circuit wherein the magnetic reluctance of the whole, magnet, air-gaps, and armature is practically uniform for all positions of the armature. This is done by arranging for an even sectional surface of the whole path of the magnetic flux by wedge shaping those parts of the iron body, such as the cylinder end, through which the magnetic lines spread radially. The armature is divided and engages the mantle 42 of the casing by means of a leather collar 43. The air is compressed in the chamber 44 between the two coils and in the interiors 45 and 46 of the same, escaping from here into the chamber 44 and pipes 5 and 6 alternately. The pipes are insulated, as previously stated. The bushings 23, 24, 25, and 26 fit air-tight. Non-magnetic guide-pieces 49 and 50 serve to keep the four poles of the magnet and plunger from touching each other and hampering a free movement of the plunger.

The secondary cylinder (shown in Fig. 11) can be of any standard construction unless auxiliary hand operation is to be provided for. Where the latter is the case, a special valve of the form shown either in Figs. 11 or 12, inclosed in the piston, is employed to enable the transmitting medium to flow from one side of the piston to the other when it is moved from the outside of the cylinder by hand. This valve comprises a stopper 60, adapted to be reciprocated in its chamber 55 by an increased pressure on either side thereof and to close alternately the openings 54 or 57 to opposite sides of the piston. This stopper 60 is nominally in the central position, as shown in Figs. 11 and 12, and so held either by reason of its own shape and construction or by means of light springs 61 and 62, as shown in Fig. 12. The piston 3 may consist of two disks 51 and 52, fastened together and provided with sliding rings or leather collars, such as 53. The stem 2 is fastened to the piston and extends to the outside of the cylinder through a stuffing-box 63 and terminates in an extension 64 of the switch-tongue, to which it is secured by means of nuts 65 and 66, as shown in Fig. 1.

The operation of a switch by a device embodying my invention is shown by the diagrams in Figs. 13 to 17, inclusive, in which the first four figures show four different positions of a car that is to be switched off from the straight track, and the diagram Fig. 17 shows the operating position of another car that is to be run straight ahead. In Fig. 13 the car is approaching the switch and the current flows, as indicated by arrows, from the trolley-wire through to car to the ground in the ordinary way. The motorman passes the first circuit-breaker 14 without paying attention to it except to leave the current on. His trolley makes contact with the circuit-breaker 14, as shown in Fig. 14, and instantly the current flows from the trolley-wire 15 through cable 18 to the left-hand coil 10, through cable 17 to circuit-breaker 14, through the trolley to the ground. Coil 10 is energized and plunger 12 pulled to the left, compressing the transmitting fluid in pipe 5 and moving piston 3 and switch-tongue 1 to the right. Now the trolley-pole leaves the first circuit-breaker 14, and plunger 12 recedes somewhat by the action of the created overpressure; but the piston 3 and switch-tongue 1 remain in position. This is accomplished without attention on the part of the motorman and before the car actually reaches the switch. The car proceeds and the trolley-pole is about to reach the other circuit-breaker 13. At this point the motorman shuts off the power. Otherwise he energizes the opposite coil 11 in a similar manner and causes the switch-tongue to assume its original position. He shuts off the current, leaving both car and switch-circuit dead for an instant. The car passes this second circuit-breaker 13, as shown in Fig. 15, and the trolley reaches 15, as shown in Fig. 16, and the power is turned on to carry the car over the switch, which is now in the desired position. To run the car straight ahead, the operation is reversed—that is, the current is turned off by the motorman in passing the first circuit-breaker 14 and turned on in passing the second circuit-breaker 13, as shown in Fig. 17, which operates the plunger in the opposite direction and the transmitting medium through pipe 6, thus setting the switch in position for running straight ahead and opening the main track.

The following points will be noted in the operation of the device.

First. The movement of the primary plunger creates not only a compression, but also a suction in the transmitting medium, so that the secondary piston is propelled by two forces.

Second. When the switch-tongue is obstructed by a hard substance, the elasticity of the transmitting medium will act to prevent breakage of the mechanism. This result is obtained without the use of additional special yielding connections for this purpose.

Third. No additional special cushioning devices are needed to cushion the intense shock caused by the movement of the switch-tongue. A common valve, such as 36 in Fig. 2, interposed into one of the pipes and properly adjusted, is sufficient for this purpose.

Fourth. The width of the slot of the rail is not the same in all switches. By making the stroke of the secondary piston as long as the maximum width found in rail-slots an automatic adjustment is obtained adaptable to any width without a special adjusting device for this purpose.

Fifth. The operation of the device will be noiseless.

Summing up, it will be observed that a device for moving a switch-tongue with my improved system employed will show the following characteristic advantages: The device is of very few parts, but many-sided in its functions. In the entire device no springs need be used. Pipes can be laid easily in places where solid power transmission could not be employed. The use of pipes establishing communication between the cylinders permits also of the quick mounting and better adjustment to be given in regard to the distribution of the circuit-breakers and cylinders along the track. This will be apparent, since it will be observed that the primary cylinder might be mounted a considerable distance away from the switch-tongue. Attention is called to the fact that there are practically only two moving parts in the device and no solid moving parts whatever in the power-transmitting medium. No special casing is required in the street, simply a small cylinder. The secondary piston is moved by double force. No additional mechanism is required on the car to operate the device and all the operating parts of the same are located outside of the car alongside of the track. An absolutely perfect insulation is provided, so that the current will not under any condition reach the ground. It is plain to the operator what to do without being obliged to previously look at the switch-tongue, and it is consequently a very simple matter for the motorman to learn the operation of the device.

The invention is not to be understood as being limited to the exact construction of the operating-cylinders and connections herein illustrated and described, as it will be obvious that various changes or modifications may be made in this construction without departing from the spirit of my invention. Any standard form of double-acting armature or solenoid may be used and the primary piston connected thereto or form a part thereof, as illustrated diagrammatically in Figs. 13 to 17, inclusive, and this as well as many other equivalent means are to be considered as within the scope of my invention and the claims herewith presented.

Especially the invention is to be understood as not limited to the purpose of moving a switch-tongue, as it will be evident that it may be employed for various other purposes, such as operating signal devices, &c., with good results. The use and application shown herein, as it has been stated, is intended as an illustration merely of one use and application of the invention.

What I claim is—

1. In a device for power transmission, the combination with the mechanism to be driven, of a piston, reciprocating in a cylinder, pipes extending from said cylinder and terminating in another cylinder, a piston reciprocating in the latter by the action of an electromagnet, or electromagnets, and means to energize said electromagnet or electromagnets alternately.

2. In a device for power transmission, the combination with the mechanism to be driven, of a piston reciprocating in a cylinder, pipes extending from said cylinder and terminating in a second cylinder, a piston reciprocating in the latter and connected to the armature of an electromagnet whereby the action of the latter creates a movement of the two pistons and the mechanism to be driven.

3. In a device for power transmission, the combination with an electromagnet or electromagnets, of a cylinder, a piston reciprocating in said cylinder and connected with the armature of said electromagnet or electromagnets, pipes extending from said cylinder and terminating in another cylinder, a piston reciprocating in the latter and connected by means to the mechanism to be driven whereby the energization of the electromagnet or electromagnets creates a movement of the armature, the two pistons and said mechanism.

4. In a device for power transmission, the combination with the mechanism to be driven, of a piston reciprocating in a cylinder, pipes extending from said cylinder and terminating in another cylinder, a piston reciprocating in the latter and acting as the armature of an electromagnet and part of the magnetic circuit of the latter, whereby the action of said electromagnet will create a movement of the armature, secondary piston and said mechanism.

5. In a device for power transmission, the combination with an electromagnet or electromagnets, of a cylinder, a piston reciprocating in said cylinder, said piston also serving as the armature of the electromagnet, being part of the magnetic circuit, pipes extending from said cylinder and terminating in another cylinder, a piston reciprocating in the latter and connected by means to the mechanism to be driven, so that the action of said electro magnet or magnets will create a movement of the armature, secondary piston and said mechanism.

6. In a device for power transmission, the combination with an electromagnet or electromagnets, of a cylinder, a piston reciprocating in said cylinder, means to transfer the action of the magnet-armature upon said piston, pipes extending from said cylinder to another cylinder, a piston reciprocating in the latter, and means to transfer the action of the latter piston upon the mechanism to be driven.

7. In a device for power transmission, the combination with an electromagnet or electromagnets, of means to transfer the action of the electro magnet or magnets upon a piston reciprocating in a cylinder, pipes extending from said cylinder to another cylinder, a piston reciprocating in the latter, and means to transfer the action of the latter piston upon the mechanism to be driven.

8. In a device for power transmission, the combination with the mechanism to be driven, of a piston, reciprocating in a cylinder, pipes extending from the latter and terminating in another cylinder, a piston reciprocating in the latter and actuated by two electromagnets arranged with their axes in a straight line and with each of the two poles in opposition to one surface of the armature, and means to energize said electromagnets alternately whereby the alternative energization of the electromagnets will impart a reciprocatory movement to the two pistons and the mechanism to be driven.

9. In a device for power transmission, the combination with the mechanism to be driven, of a piston, reciprocating in a cylinder, pipes extending from the latter and terminating in another cylinder, a piston in the latter reciprocating by the alternative action of two solenoids arranged with their axes in a straight line and their openings opposite to each other, each solenoid provided with an internal iron core whereby the alternative action of the solenoids will create a reciprocating movement of the two pistons and the mechanism to be driven.

10. In a device for power transmission, the combination with the mechanism to be driven, of a piston reciprocating in a cylinder, two pipes extending from said cylinder, each pipe terminating in the interior of one of two solenoids arranged with their axes in a straight line and with their pole-openings in opposition to each other, a plunger common to both solenoids reciprocating in the interior of the solenoids, said plunger fitting the mantle of the openings of said solenoids tightly so as to produce a pressure upon the medium inclosed in the solenoids, the pipes and the cylinder, and to cause said plunger, piston and mechanism to have reciprocating movement when said solenoids are energized alternately.

11. In a device for power transmission, the combination with the mechanism to be driven, of a piston, reciprocating in a cylinder, pipes extending from said cylinder and terminating in another cylinder, a piston reciprocating in the latter by the alternative action of two electromagnets, each of said electromagnets provided with one coil and one outer annular jacket.

12. In a device for power transmission, the combination with the mechanism to be driven, of a piston reciprocating in a cylinder, pipes extending from the latter and terminating in another cylinder, a piston reciprocating in the latter by the alternative action of two single-coil electromagnets, each of said electromagnets and each surface of their common armature provided with an outer annular jacket, each jacket of the armature fitting the jacket of one electromagnet, so that the magnetic resistance of the air-gaps between the jackets of the electromagnets and the jackets of the armature is practically constant at all positions of the armature.

13. In a device for power transmission, the combination with the mechanism to be driven, of a piston reciprocating in a cylinder, pipes extending from said cylinder and terminating in another cylinder, a piston reciprocating in the latter by the action of two electromagnets arranged with their axes in a straight line and their poles in opposition to each other, the core of each of the electromagnets hollowed out and each surface of a disk-shaped armature provided with a central plunger-like protuberance to fit the hole of each of the cores, each electromagnet and each surface of the armature provided also with an outer annular jacket, so that the energization of one magnet will create poles of one order in the hollow magnet-core and the nearest armature-jacket, and poles of opposite order in the magnet-jacket and the nearest armature-plunger, so that each corresponding couple of these four poles is in constant close proximity to each other at all different positions of the armature and the magnetic resistance of the two air-gaps in question is practically constant thereby.

14. In a device for power transmission, the combination with the mechanism to be driven, of a piston reciprocating in a cylinder, pipes extending from the latter and terminating in another cylinder, a piston in the latter fitting the mantle of the cylinder tightly and acting as the armature and part of the magnetic circuit of each of two electromagnets when energized, said electromagnets arranged with their axes in a straight line and their poles in opposition to each other, the core of each of the electromagnets hollowed out and each surface of a disk-shaped armature provided with a central plunger-like protuberance to fit the hole of each of the cores, each electromagnet and each surface of the armature provided also with an outer annular jacket, so that the energization of one magnet will create poles of one order in the hollow magnet-core and the nearest armature-jacket, and poles of opposite order in the magnet-jacket and the nearest armature-plunger, and each corresponding pair of these four poles is in constant close proximity to each other at all different positions of the armature and the long-range pull of the electromagnets is practically constant when the armature is close by or at a distant.

15. In a device for power transmission, the combination with the mechanism to be driven, of a piston reciprocating in a cylinder, pipes extending from the latter and terminating in another cylinder, a piston reciprocating in the latter by the action of electromagnets, and means intermediate the cylinders involving a restriction of the flow of the power-transmitting medium for the purpose of cushioning the intense shock created by the action of said electromagnets upon said pistons and mechanism.

16. In a device for power transmission, the combination with the mechanism to be driven, of a piston reciprocating in a cylinder, pipes extending from the latter and terminating in another cylinder, fastened to the same by means of flanges and bolts, insulating-bushings around said bolts and insulating-washers between said flanges and said cylinder to provide a perfect electric insulation between said pipes and said cylinder and prevent the electric current from passing down the pipes.

17. In a device for power transmission, the combination with the mechanism to be driven, of a piston, reciprocating in a cylinder, pipes extending from the latter and terminating in another cylinder, a piston reciprocating in the latter by the action of electromagnets, said electromagnets and their armature having those parts wedge-shaped through which the magnetic lines spread radially, in order to offer to the magnetic flux an iron body of even magnetic resistance all around when said electromagnets are energized alternately and a reciprocate movement of said pistons and said mechanism is created.

18. In a device for power transmission, the combination with the mechanism to be driven, of a piston reciprocating in a cylinder, said piston containing a chamber, channels extending from each of both ends of the chamber to one of the both surfaces of the piston, a stopper reciprocating in the chamber and adapted to close either of the internal openings of the channels tightly when engaging said opening, said stopper held centrally in such a way that a light pressure will not alter its central position, but a strong pressure drive the stopper into engagement with the opening in the chamber of one of the channels and close the channel tightly, whereby said piston can be moved either by the action of the liquid or gaseous matter inclosed in the cylinder or mechanically from outside of the cylinder, pipes extending from said cylinder and terminating in another cylinder, a piston reciprocating in the latter by the action of an electromagnet, or electromagnets, and means to energize said electromagnet or electromagnets alternately.

19. In a device for power transmission, the combination with a mechanism to be driven of a fluid-operated piston, a fluid-operating piston, electrically-operated means coöperating with said fluid-operating piston to compress a fluid and means for transmitting the fluid-pressure so produced to said fluid-operated piston causing a coexistent movement thereof, substantially as described.

20. In a device for power transmission, the combination with a mechanism to be driven of a fluid-operated piston, a fluid-operating piston, a pair of electromagnets, coöperating with said fluid-operating piston to compress a fluid, and means for transmitting the fluid-pressure so produced to said fluid-operated piston causing a coexistent movement thereof, substantially as described.

21. In a device for power transmission, the combination with a mechanism to be driven of a reciprocating fluid-operated piston, a fluid-operating piston, electrically-operated means coöperating with said fluid-operating piston to compress a fluid, and means for transmitting the fluid-pressure so produced alternately to opposite sides of said fluid-operated piston, substantially as described.

22. In a device for power transmission, the combination with the mechanism to be driven of a fluid-operated piston adapted to be reciprocated in a cylinder by fluid-pressure, a fluid-operating piston, means connecting the cylinders containing said pistons for transmitting the fluid-pressure so produced directly to said fluid-operated piston, electrically-operated means coöperating with said fluid-operating piston to compress a fluid, substantially as described.

23. In a device for power transmission, the combination with a mechanism to be driven, of a fluid-operated piston adapted to be reciprocated in a cylinder by fluid-pressure, a fluid-operating piston adapted to be reciprocated in a cylinder by the action of an electromagnet or solenoid, pipes extending and connecting between said cylinders for transmitting the fluid-pressure directly to said fluid-operated piston, substantially as described.

24. In a device for power transmission, the combination with the mechanism to be driven of a fluid-operated piston adapted to be reciprocated in a cylinder, a fluid-operating piston adapted to be reciprocated in a cylinder and connected to the armature of an electromagnet or solenoid, pipes connecting said cylinders whereby the movement of the piston in the latter cylinder creates a movement of the piston in the former cylinder, substantially as described.

25. In a device for power transmission, the combination with the mechanism to be driven of a fluid-operated piston, a fluid-operating piston operated by means of an electromagnet or solenoid, and connecting-pipes for transmitting variations in fluid-pressure from the latter to the former piston, substantially as described.

26. In a device for power transmission, the combination with a mechanism to be driven of a fluid-operated piston, a fluid-operating piston forming a part of the magnetic circuit of an electromagnet or solenoid-coil, and connecting-pipes for transmitting variations in fluid-pressure from the latter to the former piston, substantially as described.

27. In a device for power transmission, the combination with a mechanism to be driven of a fluid-operated piston, a fluid-operating piston forming the armature or solenoid of an electric coil, and connecting-pipes for transmitting variations in fluid-pressure from the latter to the former piston, substantially as described.

28. In a device for power transmission, the combination with a mechanism to be driven of a fluid-operated piston, a fluid-operating piston reciprocated in a fluid-chamber by means of a pair of electromagnets or solenoids, and connecting-pipes for transmitting variations in fluid-pressure from the latter to the former piston, substantially as described.

In testimony whereof I affix my signature in the presence of two witnesses.

HANS KOWSKY.

Witnesses:
JOHN NOLAND,
A. M. WILSON.